US005571277A

United States Patent [19]

Allred et al.

[11] Patent Number: 5,571,277

[45] Date of Patent: Nov. 5, 1996

[54] AUTOMOTIVE HOLOGRAPHIC SIGNAL LAMP

[75] Inventors: Christopher S. Allred; Dewayne A. Landwehr, both of Anderson, Ind.

[73] Assignee: General Motors Corporation, Detroit, Mich.

[21] Appl. No.: 489,493

[22] Filed: Jun. 12, 1995

[51] Int. Cl.[6] .......... B60Q 1/44

[52] U.S. Cl. .......... 362/61; 362/80; 362/293; 362/307; 362/327; 340/479; 359/13

[58] Field of Search .......... 359/2, 13, 15, 359/22, 24; 340/468, 479; 362/61, 80, 80.1, 293, 811, 812, 307, 327

[56] References Cited

U.S. PATENT DOCUMENTS

| | | | |
|---|---|---|---|
| 4,966,426 | 10/1990 | Moss et al. | 359/15 |
| 5,101,193 | 3/1992 | Smith et al. | 340/479 |
| 5,186,533 | 2/1993 | Hori | 362/80.1 |

FOREIGN PATENT DOCUMENTS

| | | |
|---|---|---|
| 0653650A1 | 5/1995 | European Pat. Off. . |
| 0653651A1 | 5/1995 | European Pat. Off. . |
| 0653649A1 | 5/1995 | European Pat. Off. . |
| 4421306A1 | 1/1995 | Germany . |
| 4334896A1 | 4/1995 | Germany . |
| 62-289444 | 12/1987 | Japan . |
| 5-21484 | 6/1993 | Japan . |
| WO94/14632 | 7/1994 | WIPO . |

*Primary Examiner*—Denise L. Gromada
*Assistant Examiner*—Alan B. Cariaso
*Attorney, Agent, or Firm*—Ernest E. Helms

[57] ABSTRACT

An automotive signal lamp is provided including a lens illuminated by a first light source on a first side, a transmissive hologram adjacent the lens for providing an image when the first light source is activated, and a reflective hologram adjacent the transmissive hologram for providing an image when the first light source is nonactuated and the lens is illuminated by a second light source on a second side of the lens generally opposite the first light source.

4 Claims, 3 Drawing Sheets

5
7
8
3
3
10

AUTOMOTIVE HOLOGRAPHIC SIGNAL LAMP

FIELD OF THE INVENTION

The field of the present invention is that of automotive signal lighting. More particularly, the field of the present invention is that of rear signal lighting, especially center high mounted stop lights, commonly referred to in the industry as CHMSLs.

BACKGROUND OF THE INVENTION

To provide product distinction in the market, it has been known to provide emblems on tail lights of automobiles. One method of providing an emblem on a tail lamp is to mount the emblem on an exterior of an automotive lens. A refinement of a simple emblem on an automotive tail lamp is to make a portion of the lens opaque such that the emblem is only displayed when the automotive signal lamp (typically a brake or tail lamp) is activated. The aforementioned refinement and its predecessor of an exterior emblem both provide a disadvantage in that it increases the size of the lamp required to provide the proper optical distribution under Federal Motor Vehicle Safety Standard (FMVSS) 108.

SUMMARY OF THE INVENTION

To provide an improvement in automotive signal lamps over that previously provided, the present invention is brought forth.

The present invention in a preferred embodiment provides an automotive signal lamp having a transmissive hologram which allows for an optical prescription, required to meet FMVSS 108, when the brake lamp is applied. When activated, the transmissive hologram provides a mainly two-dimensional image. Additionally, the present invention also includes a reflective hologram allowing a three-dimensional image to appear when the brake lamp is not applied. The three-dimensional image if desired may be purely ornamental, providing an artistic design. When the brake lamp is applied, the transmissive hologram is activated to an extent which overcomes the reflective hologram and an alternative or more full design can be provided. Optionally, a different warning signal may be utilized by the transmissive hologram to warn a potential rearward driver that an automobile intends to turn or slow down.

DESCRIPTION OF THE PREFERRED EMBODIMENT

Figure 1:
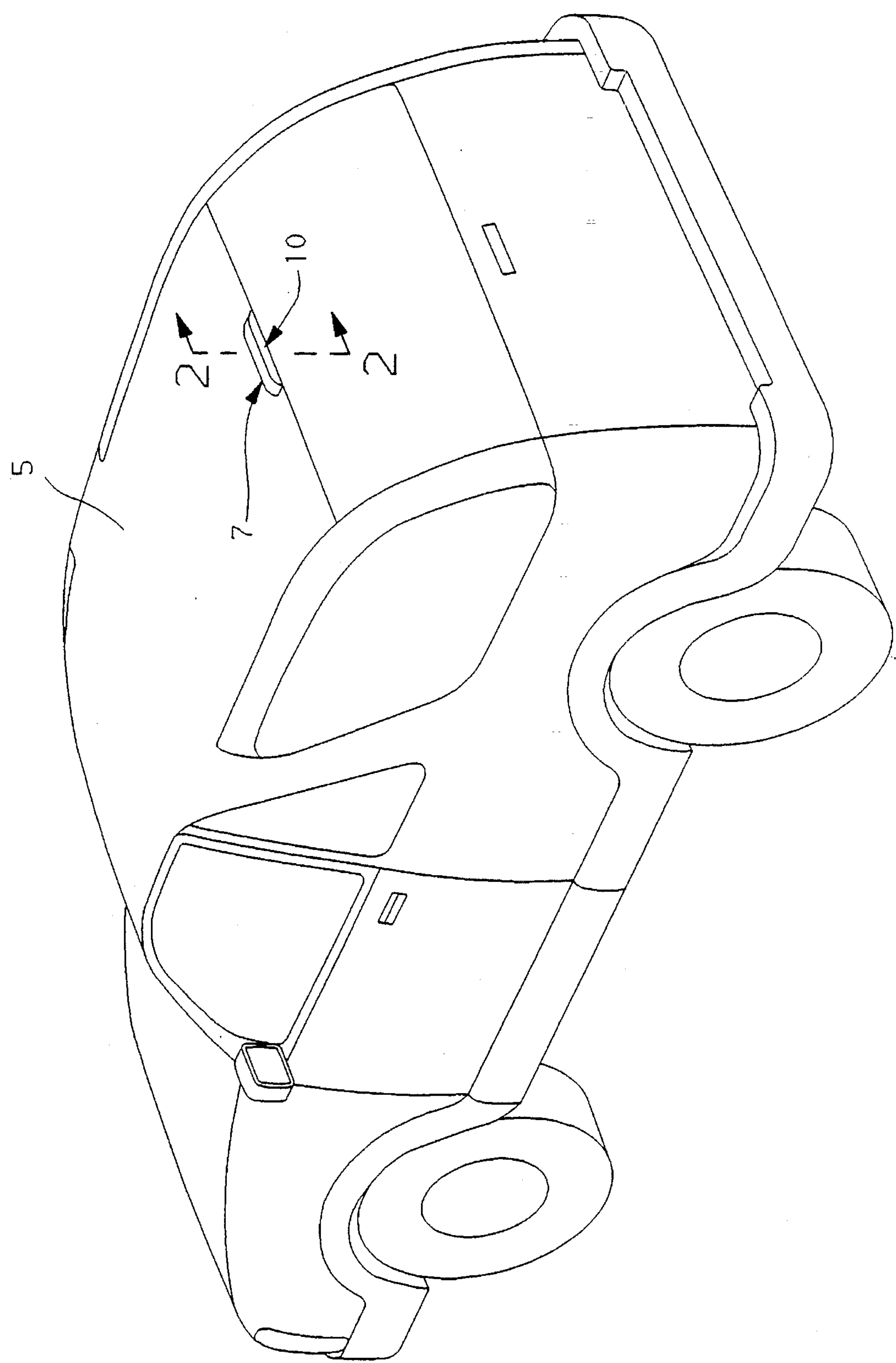
FIG. 1 is a perspective view of a preferred embodiment signal lamp according to the present invention shown in the environment of its utilization on an automotive vehicle.
Figure 2:
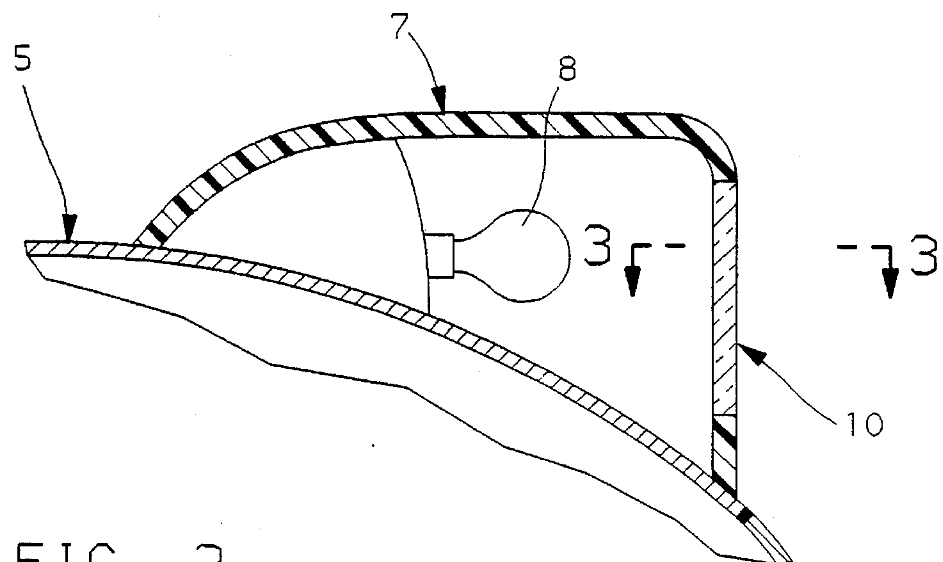
FIG. 2 is a view taken along line 2—2 of FIG. 1.
Figure 3:
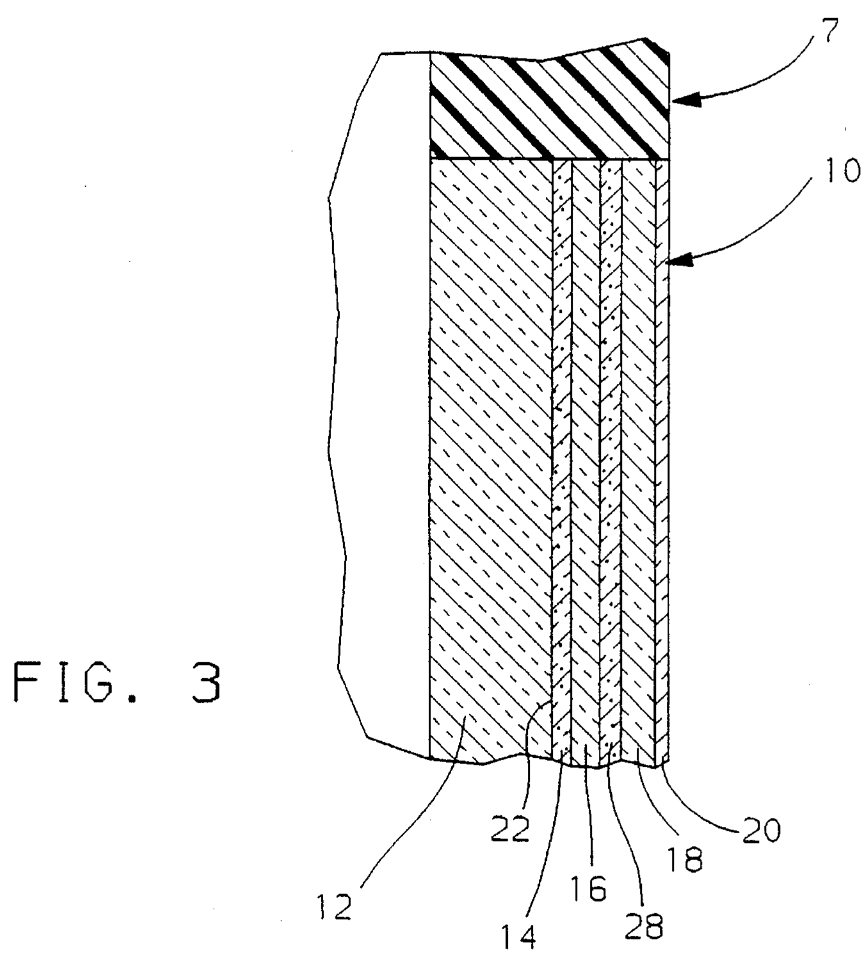
FIG. 3 is a view taken along line 3—3 of FIG. 2.
Figure 4:
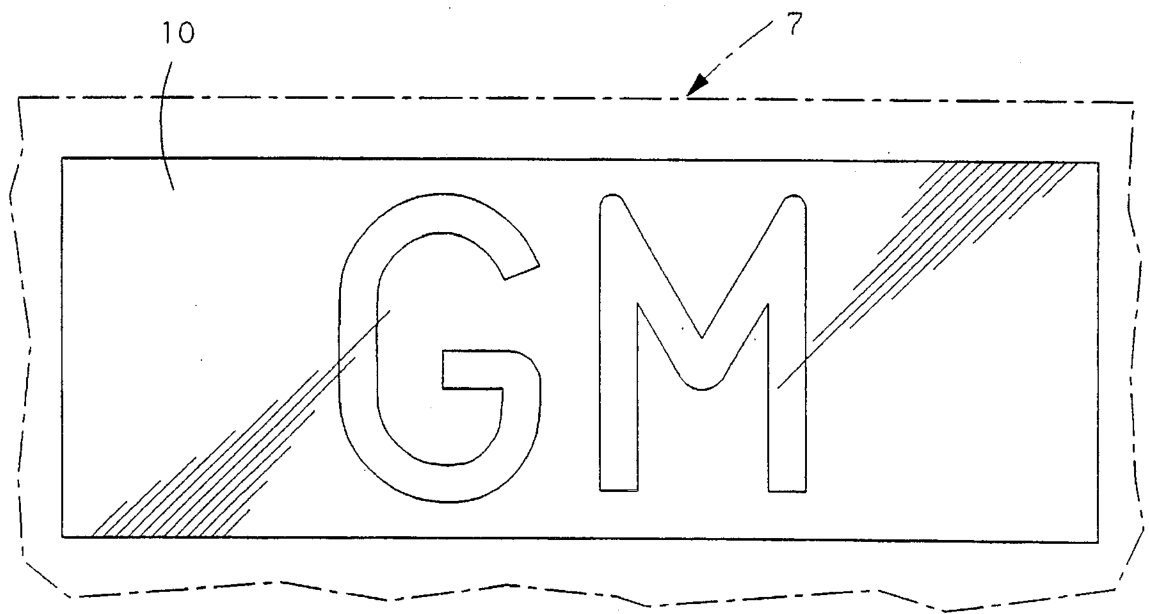
FIG. 4 is an enlarged view illustrating the image given by the tail lamp when seen in the sunlight.

Referring to FIG. 1, an automotive vehicle 5 has a center high mounted stop lamp (CHMSL) 7. Referring additionally to FIGS. 2–4, the stop lamp 7 has an incandescent or other suitable light source 8 which projects rays of illumination through a lens 10. Typically, the light source or bulb 8 will be surrounded by a reflector (not shown) to maximize the illumination which is projected through the lens 10. The lens 10 has a polycarbonate substrate 12 which is given an appropriate red tint. If desired, glass or acrylic may be utilized. If the signal lamp 7 is utilized as a directional turn signal, the tinting of the polycarbonate may be amber if so required. The polycarbonate substrate will typically be 3 mm thick.

Adjacent the polycarbonate substrate 12 is an adhesive layer 14 of less than 10 microns in thickness. The adhesive layer 14 affixes a film transmissive hologram 16 to the lens. The transmissive hologram is activated by the frequency of light which is given off by the tinted substrate 12. The transmissive hologram will typically be 7.7 microns thick.

Next to the transmissive hologram 16 is a reflective hologram 18. Between the holograms 16 and 18 is a pressure-sensitive adhesive layer 28 of less than 10 microns in thickness. The reflective hologram may typically be fabricated from a protopolymer film material. Different types of film such as silver halide emulsions, dichromated gelatin or a photoresist may be used. The reflective hologram 18 typically has a thickness of 7.7 microns. Layered on top of the reflective hologram is a hard top coating 20 of scratch-resistant coating one mil thick.

When the lighting source is not illuminated, outside light (typically sunlight) will pass through coating 20 and hit the reflective hologram 18, providing a generally three-dimensional appearance ornamental logo as seen in FIG. 4.

Figure 5:
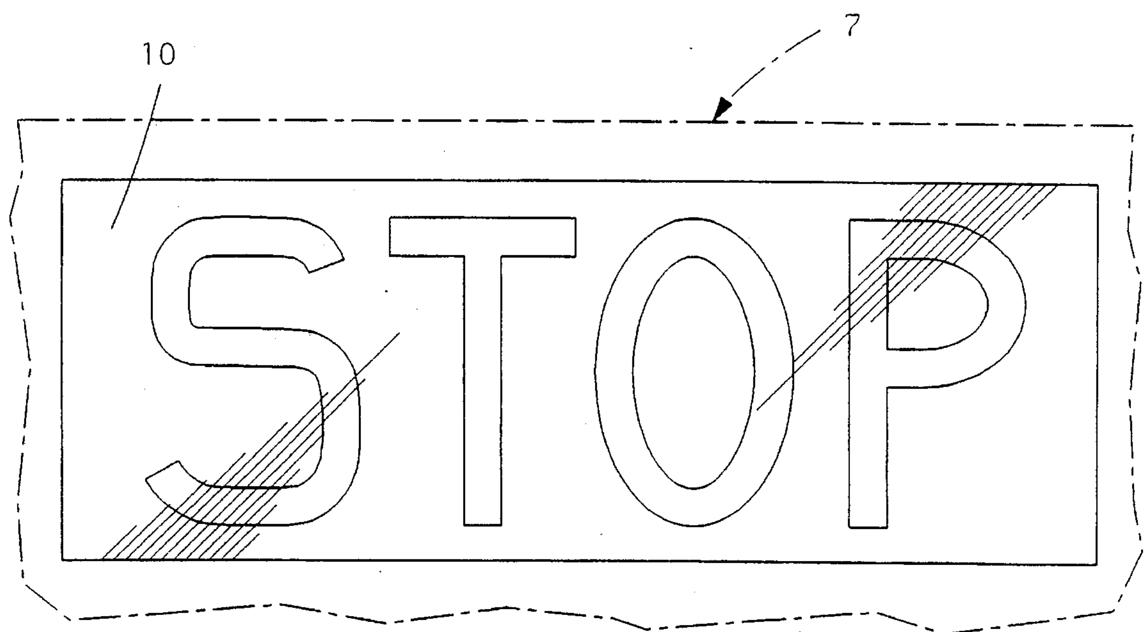
FIG. 5 is a view of the tail lamp showing the image portrayed when the light signal is actuated.

When the vehicle 5 applies the brake lights, the bulb 8 will be activated, causing light to hit on side 22 of the transmissive hologram 14 which has been made monochromatic by the substrate 12, providing the image shown in FIG. 5 and thereby virtually eliminating the image shown in FIG. 4, providing a two-dimensional image and informing a vehicle rearward of the vehicle 5 in a written format of the utilization of the brakes of the vehicle 5.

In an alternative of the present invention, a neon light-emitting diode or a filtered fiber optic light will provide a monochromatic light source which eliminates the need for tint in the lens 10.

The locations of the holograms 16 and 18 with respect to one another and the lens substrate 12 may be modified as desired. Placement of the reflective hologram on the "inside" of the lens substrate when using a tinted lens causes the reflected image to be tinted. If a monochromatic light source is utilized, the above-mentioned configuration will not cause a tinting of the reflected hologram image.

While this invention has been described in terms of a preferred embodiment thereof, it will be appreciated that other forms could readily be adapted by one skilled in the art. Accordingly, the scope of this invention is to be considered limited only by the following claims.

What is claimed is:

1. An automotive signal lamp comprising:

a first light providing a source of illumination;

a tinted lens receiving the illumination by the first light source on a first side of the lens, the lens tinting the illumination given by the first light source to a first desired frequency;

a transmissive hologram adjacent the lens for providing a first image only when the first light source is actuated, the transmissive hologram being activated by light at the first desired frequency; and a reflective hologram adjacent the transmissive hologram for providing an image differing from the first image, the second image being visible only when the first light source is not actuated and when the lens is illuminated by a second light source on a side of the lens generally opposite the first light source.

2. An automotive signal lamp as described in claim 1 which is a tail lamp.

3. An automotive signal lamp as described in claim 1 wherein the lamp serves as a center high mounted stop lamp.

4. An automotive signal lamp as described in claim 1 further including a hard coat adjacent the reflective hologram.

* * * * *